(No Model.)
J. BUCHANAN.
VEHICLE WHEEL.
No. 499,514. Patented June 13, 1893.
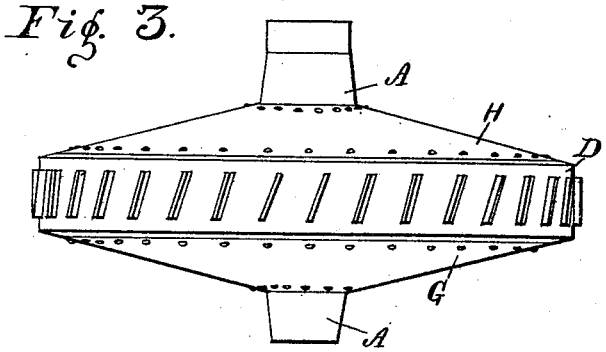
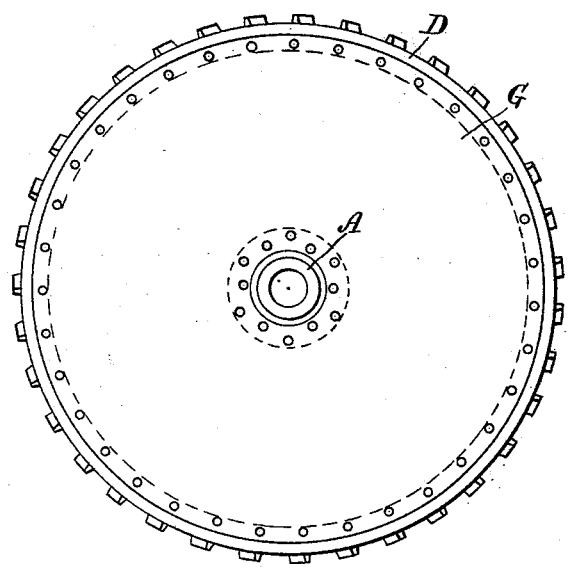
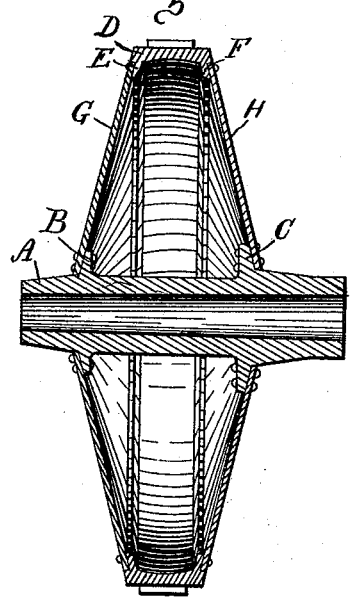
WITNESSES:
V. M. Hood.
Mabel Hood.
INVENTOR
James Buchanan.
BY
H. P. Hood.
ATTORNEY.

UNITED STATES PATENT OFFICE.

JAMES BUCHANAN, OF INDIANAPOLIS, INDIANA.

VEHICLE-WHEEL.

SPECIFICATION forming part of Letters Patent No. 499,514, dated June 13, 1893.

Application filed January 31, 1893. Serial No. 460,250. (No model.)

*To all whom it may concern:*

Be it known that I, JAMES BUCHANAN, a citizen of the United States, residing at Indianapolis, in the county of Marion and State of Indiana, have invented a new and useful Improvement in Vehicle-Wheels, of which the following is a specification.

My invention relates to an improved wheel for heavy vehicles which is designed, more particularly, to be used on traction-engines.

The object of my improvement is, to provide a wheel capable of resisting strong lateral strains, and which shall be adapted to take a firm hold with its forward edge and at the same time lift easily out of the rut.

The accompanying drawings illustrate my invention.

Figure 1 represents a central section, taken longitudinally through the hub of the wheel. Fig. 2 represents a side elevation. Fig. 3 is a plan.

In the drawings, A, indicates a hub, formed, preferably, of cast iron, and having, near its opposite ends, a pair of inwardly inclined radial flanges, B, and C. The rim, D, is formed of iron and is provided on its interior periphery with a pair of outwardly inclined flanges, E, and F. The hub and the rim are connected by means of a pair of circular dished-disks, G, and H, formed of sheet-iron or boiler-plate, and each having a central perforation to receive the end of the hub. Said disks are arranged with their concave sides toward each other and are secured to the flanges B and C of the hub, and the flanges E and F of the rim. A wheel is thus formed having smooth sides which converge from the hub toward the rim, and which, in operation in soft ground, forms a rut having outwardly inclined sides, which will not cling to the wheel, and from which the wheel rises easily; the wheel at the same time presenting at its forward edge a large contact surface and thus securing a strong hold.

The dish-shaped disks permit the use of very light material in the place of the usual heavy spokes; and at the same time present a strong resistance both to lateral and crushing strains.

I claim as my invention—

In a vehicle-wheel, the combination of the metallic hub having the inwardly inclined radial flanges B and C, the metallic rim having the outwardly inclined interior flanges E and F, and the pair of sheet-metal dished disks arranged with their convex sides outward, secured at their centers to the flanges of the hub, and secured at their outer edges to the flanges of the rim so as to be flush with the outer edges of the rim, all substantially as and for the purpose set forth.

JAMES BUCHANAN.

Witnesses:
H. P. HOOD,
V. M. HOOD.